United States Patent
Nakano

(10) Patent No.: US 7,326,057 B2
(45) Date of Patent: Feb. 5, 2008

(54) LANGUAGE LEARNING COMPUTER SYSTEM

(76) Inventor: Kenichiro Nakano, 1-7, Hiraodai 3-chome, Uji-shi, Kyoto (JP)

( * ) Notice: Subject to any disclaimer, the term of this patent is extended or adjusted under 35 U.S.C. 154(b) by 731 days.

(21) Appl. No.: 10/846,551

(22) Filed: May 17, 2004

(65) Prior Publication Data

US 2004/0215446 A1    Oct. 28, 2004

(51) Int. Cl.
*G09B 3/02*    (2006.01)
*G09B 1/00*    (2006.01)

(52) U.S. Cl. .................................. 434/176; 434/167
(58) Field of Classification Search .............. 434/167, 434/176
See application file for complete search history.

(56) References Cited

U.S. PATENT DOCUMENTS 5,882,202 A * 3/1999 Sameth et al. ............... 434/157
2002/0160341 A1* 10/2002 Yamada et al. .............. 434/157

FOREIGN PATENT DOCUMENTS

| JP | 60-195584 | 10/1985 |
| JP | 5-313686 | 11/1993 |
| JP | 2000-070242 | 3/2000 |
| JP | 2001-318592 | 11/2001 |
| JP | 2001-338077 | 12/2001 |
| JP | 2002-268537 | 9/2002 |

OTHER PUBLICATIONS

Bosseler et al ("Development and Evaluation of a Computer-Animated Tutor for Vocabulary and Language Learning in Children with Autism", Journal of Autism and Developmental Disorders, vol. 33, No. 6, Dec. 2003).*
Notice of Grounds for Rejection issued on Nov. 30, 2005 for U.S. Appl. No. 2002-343591(with English translation).
Notice of Grounds for Rejection issued on Feb. 21, 2006 for U.S. Appl. No. 2002-343591(with English translation).

(Continued)

*Primary Examiner*—David Hudspeth
*Assistant Examiner*—Samuel G Neway
(74) *Attorney, Agent, or Firm*—Wenderoth, Lind & Ponack, L.L.P.

(57) ABSTRACT

A language learning computer system is proposed which allows students to learn a foreign language as naturally as a baby learns its mother tongue. The computer system has a CPU which is programmed to show a first character as an instructor and a second character as a student on the display, produce a voice sound from the speaker, and move the first character corresponding to the voice sound produced from the speaker. If a student operates the input device corresponding to the movement of the first character, the CPU moves the second character exactly as the first character moves. In stage 2, if the student operates the input device corresponding to the voice sound produced from the speaker, the CPU moves the second character corresponding to the voice sound produced by the speaker. In stage 3, if a voice sound picked up by a microphone coincides with the voice sound produced by the speaker, the CPU moves the second character corresponding to the voice sound produced by the speaker.

11 Claims, 8 Drawing Sheets

OTHER PUBLICATIONS

"Edutainment that parent and children enjoy" I/O 1996, Apr. edition, Japan, Kabushikikaisha Kogakusha, Apr. 1, 1996, vol. 21, fourth issue, pp. 130-137.

"Personal Computer Soft that parent and children enjoy golden week", published by PC Club, Jun. 1998 issue, Japan, by Mainichi Newspaper, Jun. 1, 1998, vol. 2, seventh issue, pp. 65-72.

"Summer Vacation, Personal Computer Soft that children can play", Nikkei Personal Computer, 1994, Summer joint issue, Japan, by Nikkei BP, Jul. 18, 1994, issue 221, pp. 188-193.

Learning Web Project learning digital revolution, Japan, Kabushikikaisha Gakushu Kenkyushi, Jul. 25, 200, First edition, pp. 100-105, IBN: 4-05-700029-1.

\* cited by examiner

Fig. 3

| Activity | Movements | Voice | Image | Operation |
|---|---|---|---|---|
| X<br>Y<br>Z | 1→2→3 | a→b→c | A→B→C | 1→2→3 |

The student pronounces the words "Run forward".

⇧

The student character moves corresponding to the voice pronounced by the student.

LANGUAGE LEARNING COMPUTER SYSTEM

BACKGROUND OF THE INVENTION

This invention relates to a computer system for use in learning languages.

In an ordinary foreign language class, one instructor teaches a plurality of students. Among students, some are advanced in their study and others are not. One instructor cannot sufficiently take care of all these students. In most of such foreign language classes, instructors use students' mother tongue to teach their students foreign languages. Students thus have to memorize and understand foreign languages not directly but through their mother tongue. This is inefficient.

Some of recent foreign language schools employ a man-to-man teaching system, which is of course costly. Further, even in schools using this system, most instructors still use students' mother tongue to teach them foreign languages.

In order to arouse interest of students, a computer game type foreign language learning machine has been proposed in which a student moves a character on the screen as a student's self-image through a key matrix corresponding to a word or words produced from a speaker (see JP patent publication 2002-268537). But with this method too, students cannot learn a foreign language as naturally as a baby learns its mother tongue, even if they do not have much knowledge of the language they are going to study.

An object of the invention is to provide a computer system which allows students to learn a foreign language as naturally as a baby learns its mother tongue.

SUMMARY OF THE INVENTION

The language learning computer system according to this invention comprises a control unit, a display and a speaker. The display and the speaker are connected to and driven by the control unit. An input device is further connected to the control unit. The control unit performs a first stage of control and a second stage of control. The first stage includes the steps of showing a first character as an instructor and a second character as a student on the display, producing a voice sound from the speaker, causing the first character to make a movement corresponding to the voice sound produced from the speaker, and causing the second character to make the same movement as the movement of the first character if the input device is operated in a predetermined manner. The second stage, which is performed after the first stage, includes the steps of showing the second character on the display, producing a voice sound from the speaker, and causing the second character to make a movement corresponding to the voice sound produced from the speaker if the input device is operated in a predetermined manner. The computer system may further include a sound input device such as a microphone, and the control unit may be programmed to perform a third stage of control which includes the steps of showing the second character on the display, producing a voice sound from the speaker, and causing the second character to make a movement corresponding to the voice sound produced from the speaker if a voice sound picked up by the microphone coincides with the voice sound produced by the speaker.

Preferably, the first and second characters are taken after a human being or an animal other than a human. Preferably, the movement of either of the first and second stages is one movement of each of the characters as a human or an animal, and is a part of an activity comprising a plurality of such movements, either of the first and second stages being performed a plurality of times to perform a plurality of such activities. Preferably, each of the first to third stages further includes the step of evaluating an operation input applied to the input device. Preferably, the third stage further includes the step of evaluating the voice sound picked up by the microphone. Preferably, each of the first to third stages further includes the step of storing data on advance levels of the activities.

The control unit is programmed to produce a word or words from the speaker. Such a word or words may be produced by a voice synthesizer or may be produced from a voice recorder.

The input device may be a keyboard, a mouse, a trackball, a joystick and/or a dedicated key switch.

The control unit is programmed to analyze a voice sound picked up by a microphone and determines if it is a meaningful word or words.

Other features and objects of the present invention will become apparent from the following description and the accompanying drawings.

BRIEF DESCRIPTION OF THE DRAWINGS

In the drawings:

FIG. 3 is a table in the memory containing activity data;

DETAILED DESCRIPTION OF THE PREFERRED EMBODIMENT

Figure 1:
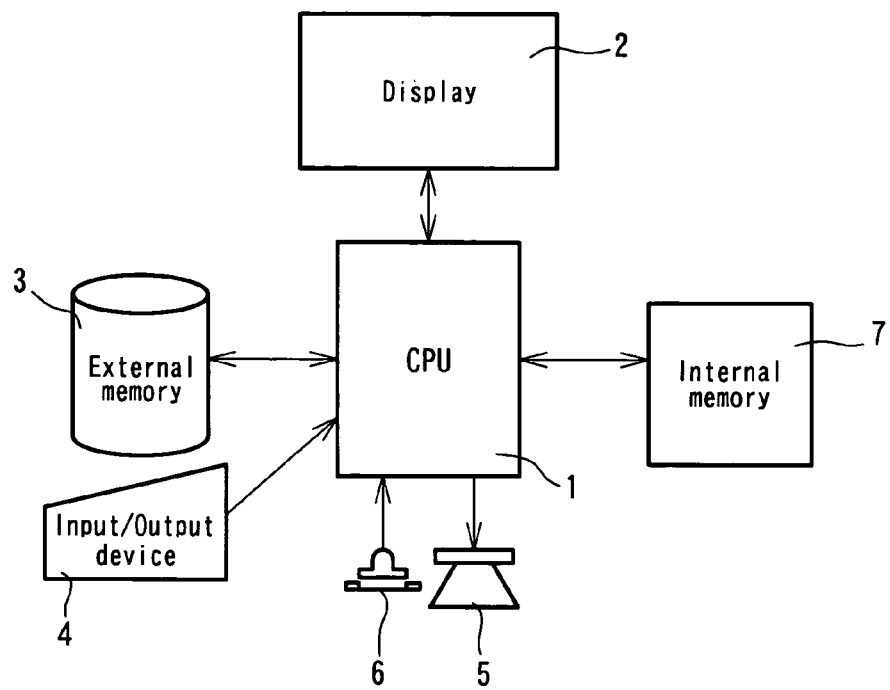
FIG. 1 is a schematic block diagram of the language learning computer system according to this invention, showing its hardware structure.

Now referring to the drawings, the embodiment of the invention will be described. FIG. 1 shows the hardware structure used for the language learning computer system according to the invention. As shown, the computer system comprises a central processing unit (CPU) 1 to which is connected a display 2 such as a cathode ray tube (CRT) or a liquid crystal display (LCD). The CPU 1 controls the display 2 to display animated and/or still images thereon. Also connected to the CPU 1 are a detachable external memory device 3 which stores programs for controlling images and sounds and other data, an input device 4 through which various control signals are to be input. The input device may comprise a keyboard, a mouse, a track ball or pad, a joystick and/or a key switch. A speaker 5 and a microphone 6 are also connected to the CPU 1. The computer system further includes an internal memory device 7 for storing programs, temporary data and parameters, such internal memory device 7 including a read only memory (ROM) and/or a random access memory (RAM). Other input/output devices may be added. Between the input/output devices and the CPU 1, the computer system further includes various other essential units and parts, including drivers, an A/D converter, a sound synthesizer, and other interfaces. The computer system of the present invention, which includes the CPU 1 and the above-described various parts, may be a personal computer or a dedicated computer game machine.

Figure 2:
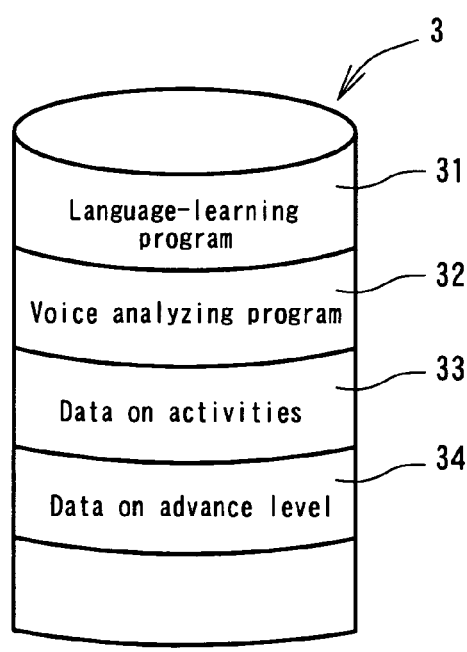
FIG. 2 is a schematic view of the interior of an external memory device of the computer system of FIG. 1.

As shown in FIG. 2, the external memory device 3 contains a language learning program 31. This program is a process which guides a student through the language learning steps to be described below. Besides this program 31, the memory 3 contains a voice analyzing program 32, activity data 33, and data 34 concerning the individual students' advance levels. The voice analyzing program 32 recognizes words that are picked up by the microphone 6 by analyzing digitized voice signals corresponding to the words. The advance level data 34 are data concerning the advance levels of individual students, and include test scores and instructors' evaluation.

The term "activity" of the activity data 33 refers to any activity that involves more than one movement of the body or a body part of a person, such as tennis, domestic chores, or driving a car. "One movement" of the body or a body part of a person refers to e.g. "walking", "running", "jumping", raising an arm", "sitting", or "standing up".

FIG. 3 shows a table stored in the memory. In the leftmost column of the table of FIG. 3, a plurality of activities are shown (by icons, numbers or letters such as X, Y, Z . . . as shown) of which simpler ones (i.e. activities involving lesser movements) are shown at higher levels of the column. In the "movement" column, the movements constituting each activity are shown from the beginning to the end of each activity. For example, the activity X in the table of FIG. 3 is made up of three movements 1, 2 and 3. If the movement 1 is "walking", movement 2 is "running" and movement 3 is "jumping", the activity X comprises walking, running and then jumping. In the "voice" column, letters a, b and c are shown from left to right. The letters a, b and c represent voice signals corresponding to movement 1 or "walking", movement 2 or "running", and movement 3 or "jumping", respectively. The CPU controls the speaker 5 to produce voice sounds corresponding to the voice signals a-c. The image signals A, B and C in the "image" column and the operating signals 1-3 in the "operation" column also correspond to the movements 1-3, respectively. The CPU drives the display 2 to display images corresponding to the image signals A-C. Since the signals in each column correspond to the signals in every other column, any signal in any column can be linked to signals in the other columns. The images to be displayed on the display may include backgrounds in addition to images directly linked to the corresponding movements.

The learning system of this invention employs a three-stage learning process. Stage 1 is a mimic stage in which a student mimics the movement of a computer-generated instructor. In stage 2, the student repeats the movements corresponding to voices. In stage 3, the CPU indicates a voice signal on the display, checks if the voice produced by the student corresponds to the voice signal, and if it does, shows an image corresponding to the movement corresponding to the voice signal, thereby indicating that his or her pronunciation is correct.

Figure 4:
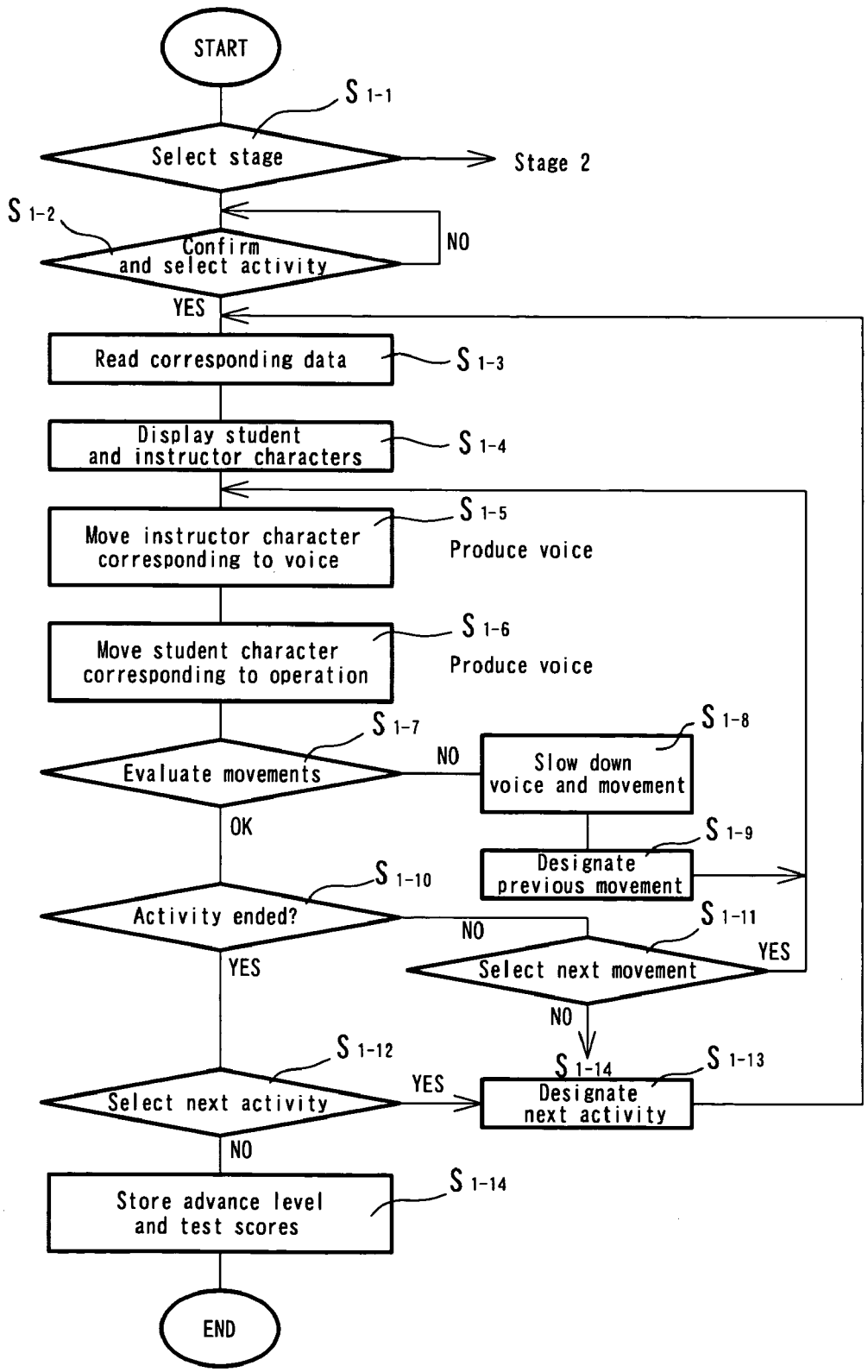
FIG. 4 is a flowchart showing the process of stage 1.
Figure 7A:
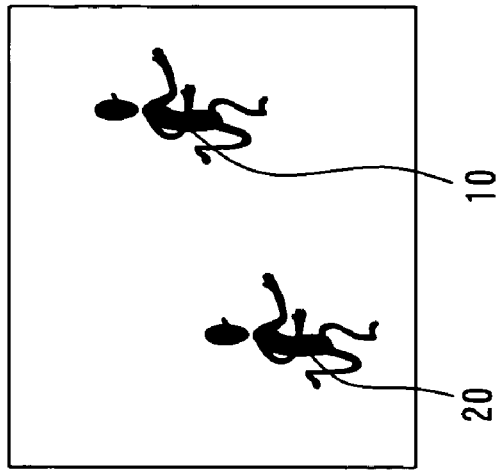
FIG. 7 shows images shown on the display in stage 1.
Figure 7B:
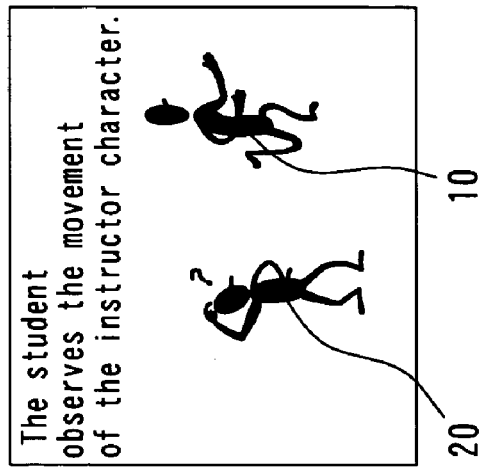
Figure 7C:
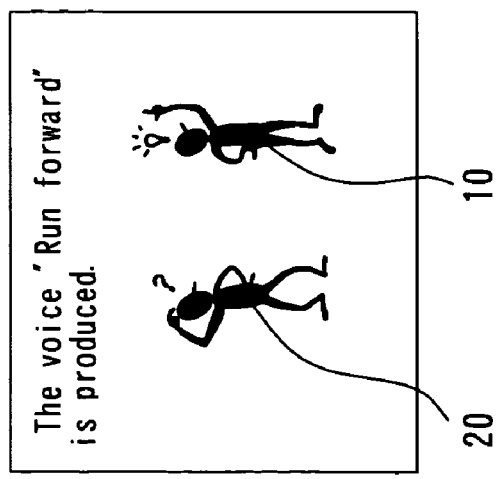

This process will be described in detail. As shown in FIG. 4, the student selects a stage in step $S_{1-1}$. If stage 1 is selected, the student then selects an activity and confirms it in step $S_{1-2}$. When the student selects an activity, the CPU shows his or her advance level, test scores and/or evaluation so that the student can select the right activity. When an activity is selected, the CPU searches the table of FIG. 3 for the data on the selected activity and reads all of the data on the selected activity in step $S_{1-3}$. In step $S_{1-4}$, the CPU indicates the image corresponding to the first image signal in the selected activity on the display 2. As shown in FIG. 7, the image may comprise two characters 10 and 20, the character 10 as an instructor and the character 20 as the student. No voice is produced at this stage. The image may include a background. In the next step $S_{1-1}$, the CPU drives the speaker 5 to produce the first voice (frame A of FIG. 7). Immediately after the first voice is produced, the instructor character 10 makes a movement corresponding to the voice produced as shown in the frame B of FIG. 7. While not shown, the instructor character 10 may begin the corresponding movement simultaneously when the voice is produced. The student or computer operator listens to the voice and observes how the instructor character 10 reacts to this voice.

When the instructor character 10 on the screen stops its movement, e.g. stops running (the fact that the character 10 has stopped his movement may be audibly notified), the operator/student now tries to move his or her self-image 20 just as the instructor character 10 moved by operating the input device 4, for example by pressing the "1" key of the keyboard. The CPU may be programmed to move both the student character 20 and the instructor character 10 and also produce the corresponding voice when the operator/student presses a key (frame C of FIG. 7). When a key, e.g. "1" key is pressed, the CPU compares the signal corresponding to the "1" key with the signal in the "operation" column in step $S_{1-7}$. If they do not coincide, the CPU sets the program so that the previous voice and movement outputs will be produced more slowly in step $S_{1-8}$, sets the program to repeat the previous movements in step $S_{1-9}$, and returns to step $S_{1-5}$ to repeat the steps $S_{1-5}$ to $S_{1-7}$. While not shown in the flowchart of FIG. 4, between the steps $S_{1-7}$ and $S_{1-8}$, a step may be provided which allows the student to select to proceed to step $S_{1-10}$ even if his or her reaction to the movement of the instructor and the voice is wrong.

If the student is determined to have reacted correctly to the instructor's movement in step $S_{1-7}$, the CPU proceeds to step $S_{1-10}$. If all the movements of the selected activity have finished, the program proceeds to step $S_{1-12}$. If not, the program proceeds to step $S_{1-11}$ where the student can skip the remaining movements of the selected activity and proceeds to step $S_{1-13}$. If the answer is yes in step $S_{1-10}$, the program proceeds to step $S_{1-12}$, where the student can decide whether to select another activity or exit the session. If the student decides to select another activity, the program sets the selected activity in step $S_{1-13}$. If the student decides to exit the session, the program stores, in the area of the advance level data 34 in the external memory 3, the advance level of the student and his or her performance evaluation of each movement and comprehensive evaluation of the activity in step $S_{1-14}$. The CPU may be programmed to carry out a plurality of movements continuously if the student enters a command to do so in e.g. step $S_{1-14}$.

Figure 5:
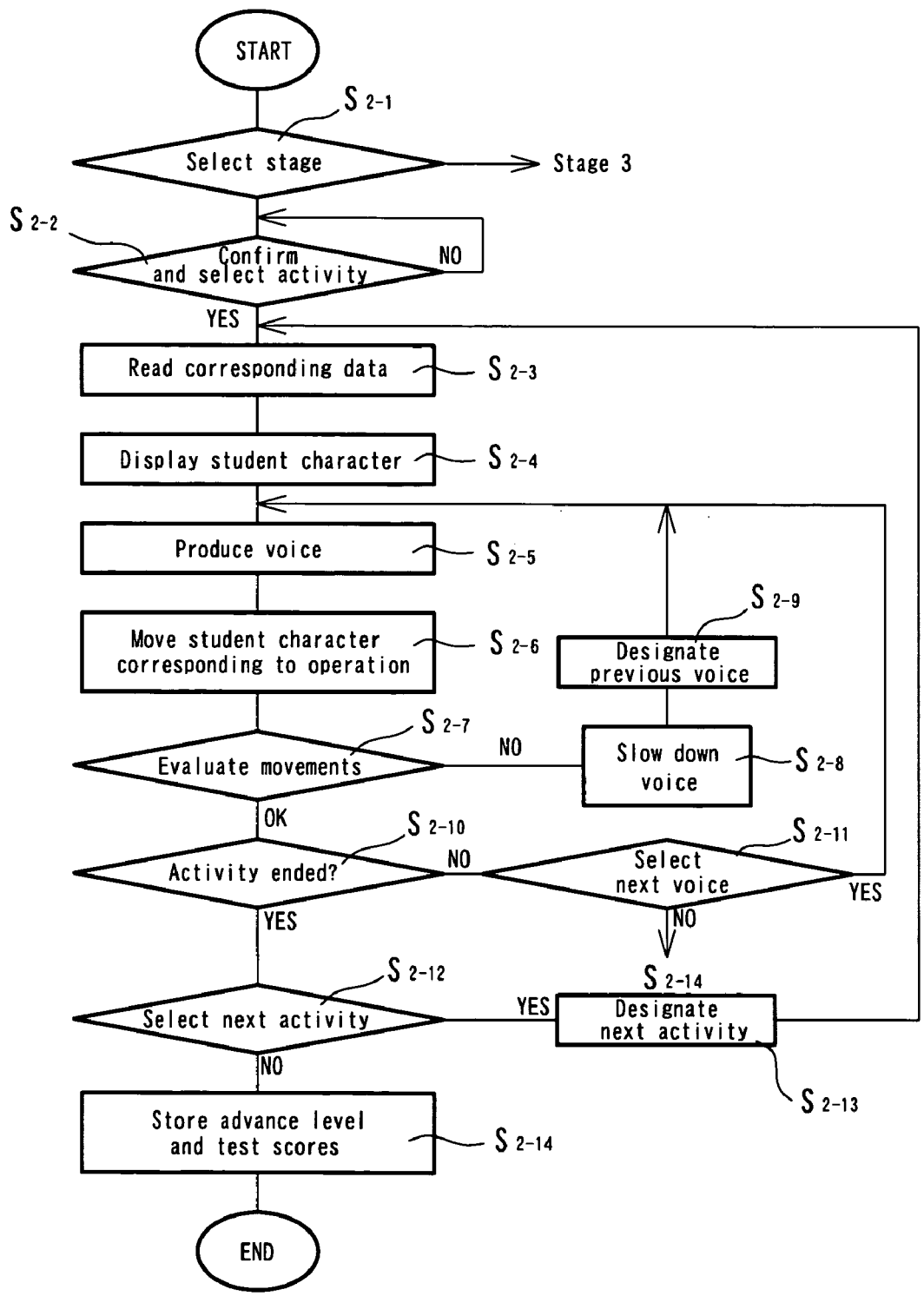
FIG. 5 is a flowchart showing the process of stage 2.
Figure 8B:
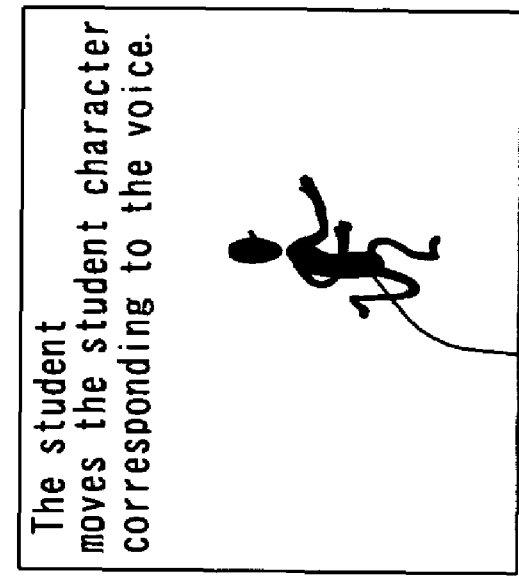
FIG. 8 shows images shown on the display in stage 2.
Figure 8A:
Figure 8A:
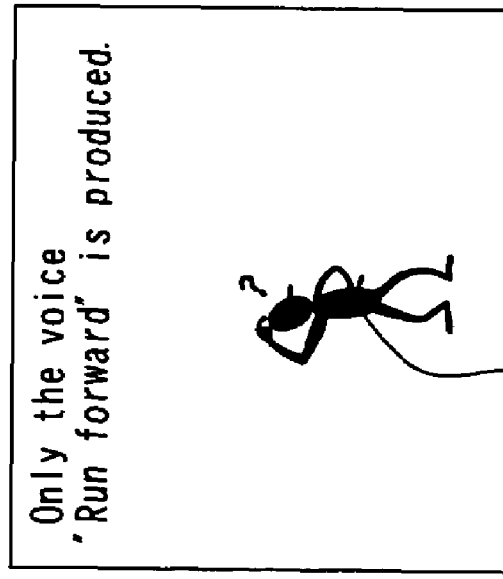

If the student selects stage 2 or relearning stage, the program proceeds through steps $S_{2-1}$, $S_{2-2}$ and $S_{2-3}$ of FIG. 5. These steps are exactly identical to steps $S_{1-1}$ to $S_{1-3}$. In step $S_{2-4}$, the program indicates the character 20 as the student as shown in frame A of FIG. 8 (letters in the figure are not shown). In step $S_{2-5}$, the program activates the speaker 5 to produce a voice corresponding to the first movement of the activity selected in step $S_{2-5}$. For example, this voice is "run forward" as shown in frame A of FIG. 8. The operator/student listens to this voice and in step $S_{2-6}$, operates the input device 4 to move the student character 20 corresponding to the voice. In step $S_{2-7}$, the computer compares the signal corresponding to the operation of the input device with the signal in the operation column of the table corresponding to the signal in the voice column. If they do not coincide, the CPU sets the program to slow down the voice output in step $S_{2-8}$, and to repeat the previous voice in step $S_{2-9}$, and returns to step $S_{2-5}$. An extra step may be provided between the steps $S_{2-7}$ and $S_{2-8}$ so that the student can select to proceed to step $S_{2-10}$ even if his or her performance was determined to be poor in step $S_{2-7}$.

In step $S_{2-10}$, the program checks whether the selected activity has ended. If not, the operator/student decides whether to select the next movement on the screen in step $S_{2-11}$. If the next movement is selected, the program prepares the next movement and returns to step $S_{2-5}$. If the student selects to quit, the program proceeds to step $S_{2-4}$.

When the selected activity has ended, the operator/student decides whether to proceed to the next activity on the screen in step $S_{2-14}$. If the student decides to proceed to the next activity, the program prepares the next activity in step $S_{2-13}$ and returns to step $S_{2-3}$. If the student decides to quit, the program stores information on where the student quit and test scores in area of the advance level data 34.

Figure 6:
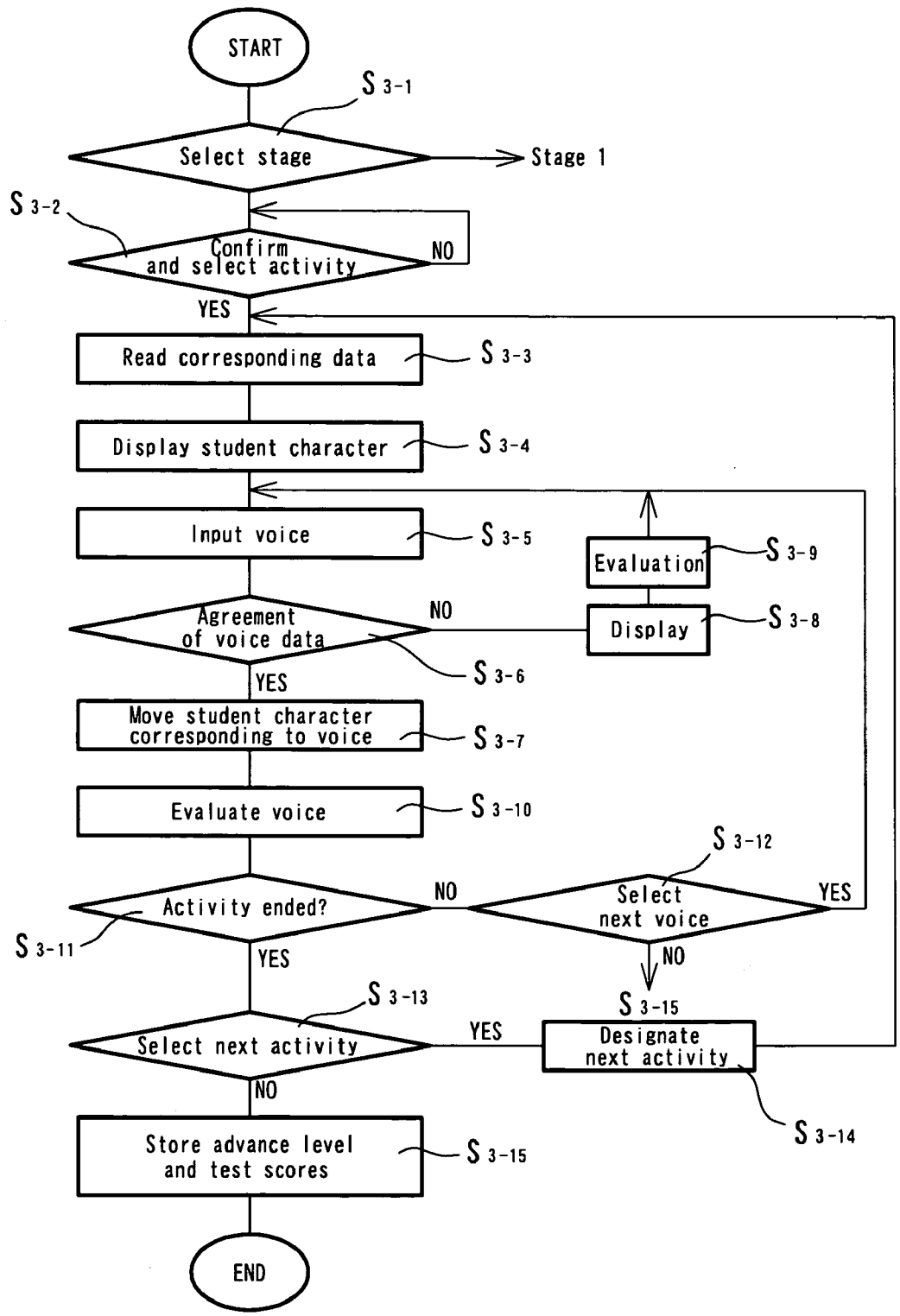
FIG. 6 is a flowchart showing the process of stage 3.
Figure 9A:
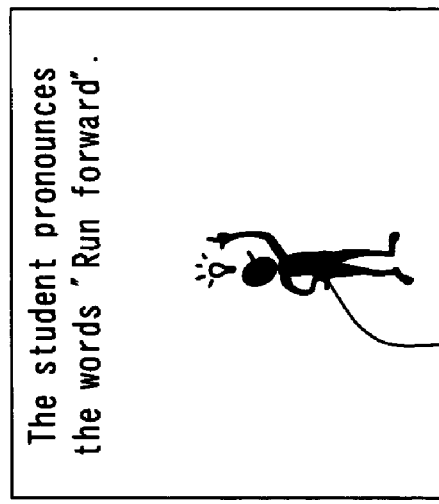
FIG. 9 shows images shown on the display in stage 3.
Figure 9B:
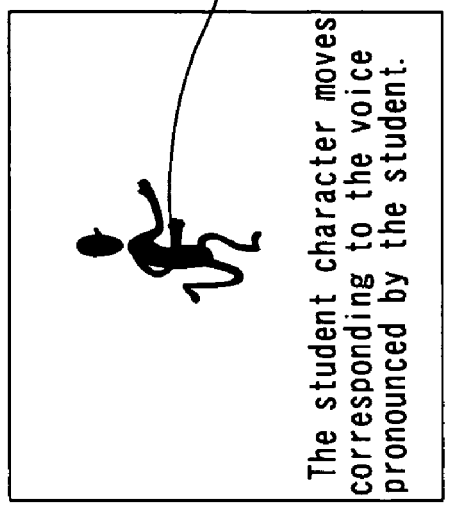

Stage 3 is an advanced stage, where the student actually pronounces words learned so far. This process is shown in FIG. 6. Steps $S_{3-1}$, $S_{3-2}$ and $S_{3-3}$ are substantially identical to the first three steps of stage 2. In the next step $S_{3-4}$, the program drives the display to show an image corresponding to the image signal in the image column of the table. The frame A of FIG. 9 shows such an image. Simultaneously, the CPU activates the speaker to produce a voice. In step $S_{3-5}$, the operator/student tries to pronounce the exact word or words produced from the speaker in front of the microphone 6. For example, in FIG. 9, the word "run forward" is produced from the speaker, and the operator/student tries to pronounce the words "run forward".

In the next step $S_{3-6}$, the CPU analyzes the voice signal picked up by the microphone 6 and digitized by the AD converter to check if this signal is essentially identical to the signal in the voice column of the table. If it is, the character on the display begins the movement corresponding to the voice produced from the speaker. For example, in FIG. 9, the character 20 or the student's self-image begins to "run forward" as shown in the frame B of FIG. 9. If the signals do not match, this fact is indicated on the screen and a negative evaluation is recorded. The program then returns to step $S_{3-5}$.

In step $S_{3-10}$, which follows step $S_{3-10}$, the program determines the learning level of the student. For example, if the student pronounces the word or words correctly in the first round, the highest point is given, and if he or she fails only once, the second highest point is given, and so on.

In step $S_{3-11}$, the program checks if the selected activity has ended. If not, the student decides whether to proceed to the next word or words or to proceed to the next activity. If the student decides to proceed to the next word or words, the program returns to step $S_{3-5}$. If the student has decided to quit, the program proceeds to step $S_{3-15}$.

When the selected activity has ended, the program proceeds to step $S_{3-13}$, where the operator/student decides whether to proceed to the next activity or to quit. If the student decides to proceed to the next activity, the program prepares for the next activity in step $S_{3-14}$ and returns to step $S_{3-3}$. If the student decides to quit, the program stores the advance level and test scores of the student in the area for the advance level data 34.

In stage 2 or 3, the system may be programmed so that the operator/student can choose to perform a plurality of movements continuously in e.g. step $S_{2-4}$ or $S_{3-4}$. The student can select any movement and can perform a plurality of movements in any desired order, irrespective of his or her current advance level. The characters may not necessarily have to be human characters, but may be animals, bugs or imaginary objects.

This system can be used to learn/master any language.

Using this system, students can efficiently learn and master any foreign language as naturally as they have mastered their mother tongue in a short period of time.

What is claimed is:

1. A language learning computer system comprising a control unit, a display, a speaker, said display and said speaker being connected to and driven by said control unit, and an input device connected to said control unit, said control unit being programmed to perform:
   1) a first stage of control including:
      a) showing a first character as an instructor and a second character as a student on said display;
      b) producing a voice sound from said speaker;
      c) causing said first character to make a movement corresponding to the voice sound produced from said speaker; and
      d) causing said second character to make the same movement as the movement of said first character if said input device is operated in a predetermined manner; and
   2) a second stage of control which is performed after said first stage and includes:
      a) showing said second character on said display;
      b) producing a voice sound from said speaker; and
      c) causing said second character to make a movement corresponding to the voice sound produced from said speaker if said input device is operated in a predetermined manner.

2. The language learning computer system of claim 1 further comprising a sound input device connected to said control unit;
   said control unit further being programmed to perform a third stage of control including:
      a) showing said second character on said display;
      b) producing a voice sound from said speaker; and
      c) causing said second character to make a movement corresponding to the voice sound produced from said speaker if a voice sound picked up by said sound input device coincides with the voice sound produced by said speaker.

3. The language learning computer system of claim 1 wherein said first and second characters are taken after a human being or an animal other than a human, and wherein the movement of either of the first and second stages is one movement of each of the characters as a human or an animal, and is a part of an activity comprising a plurality of such movements, either of said first and second stages being performed a plurality of times to perform a plurality of such activities.

4. The language learning computer system of claim 2 wherein the movement of the third stage is one movement of the second character as a human or an animal, and is a part of an activity comprising a plurality of such movements, said third stage being performed a plurality of times to perform a plurality of such activities.

5. The language learning computer system of claim 1 wherein each of said first and second stages further includes evaluating an operation input applied to said input device.

6. The language learning computer system of claim 2 wherein said third stage further includes evaluating an operation input applied to said input device.

7. The language learning computer system of claim 2 wherein said third stage further includes evaluating the voice sound picked up by said sound input device.

8. The language learning computer system of claim 3 wherein either of said first and second stages further includes storing data on advance levels of said activities.

9. The language learning computer system of claim 4 wherein either of said first and second stages further includes storing data on advance levels of said activities.

10. The language learning computer system of claim 3 wherein said third stage further includes storing data on advance levels of said activities.

11. The language learning computer system of claim 4 wherein said third stage further includes storing data on advance levels of said activities.

* * * * *